United States Patent [19]

Wilson et al.

[11] 4,028,686

[45] June 7, 1977

[54] DIGITAL DETECTOR

[75] Inventors: Michael A. Wilson; Gordon E. Gee, both of Sarasota, Fla.

[73] Assignee: Electro Corporation, Sarasota, Fla.

[22] Filed: May 10, 1976

[21] Appl. No.: 684,564

Related U.S. Application Data

[63] Continuation of Ser. No. 359,463, May 11, 1973.

[52] U.S. Cl. .............................. 340/195; 324/173; 340/253 C; 340/271; 361/76; 361/236
[51] Int. Cl.² ..................... G08B 21/00; G01P 3/48; G01P 3/54
[58] Field of Search ............... 340/253 C, 195, 181; 318/563, 601, 602

[56] References Cited

UNITED STATES PATENTS

| | | | |
|---|---|---|---|
| 3,513,469 | 5/1970 | Christensen | 324/173 |
| 3,683,354 | 8/1972 | Enk | 340/271 |
| 3,761,811 | 9/1973 | Aberle | 324/173 |

Primary Examiner—Thomas B. Habecker
Attorney, Agent, or Firm—Wegner, Stellman, McCord, Wiles & Wood

[57] ABSTRACT

A detector for a dynamic phenomenon with a cyclically varying condition, as motion of a rotating part. At least three digital sensors are separated in phase with respect to the cyclic condition. The instantaneous outputs of the sensors have a plurality of repeating sequential states so long as the dynamic phenomenon exists. The instantaneous outputs of the sensors have at least one state which does not occur during existence of the dynamic phenomenon but which does occur in the absence thereof. Logic circuits respond to the digital sensor outputs and detect information about the dynamic phenomenon. Detection of the repetition rate of an instantaneous output state of the sensors provides a measure of speed. An absence of rotation is indicated by the occurrence of another output state. In another disclosed embodiment, the detector monitors a three phase power system and detects a phase outage by the occurrence of an abnormal sensor output state.

3 Claims, 13 Drawing Figures

DIGITIZED OUTPUTS OF MAGNETIC PICKUPS 13a, 13b AND 13c.

FIG. 2
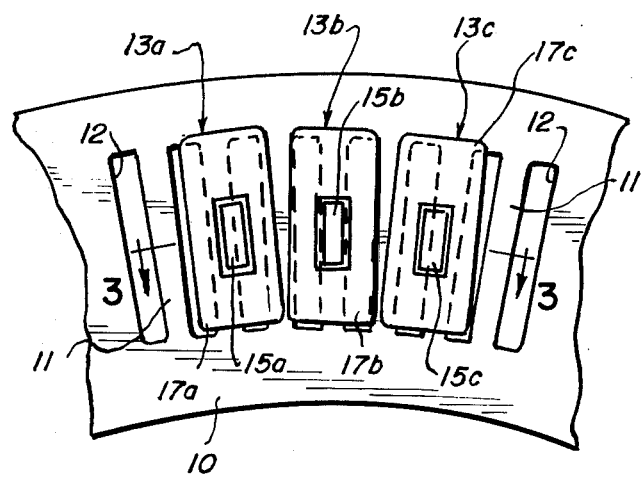
FIG. 3
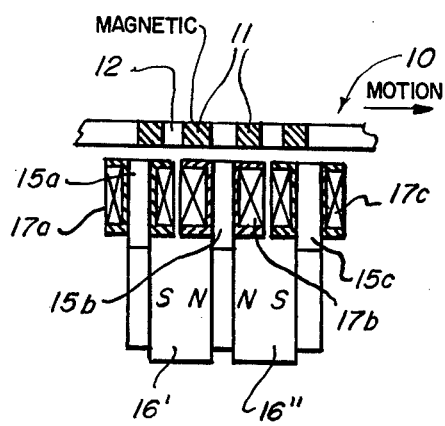
FIG. 7A
FIG. 7B
FIG. 7C
FIG. 7D
FIG. 7E
FIG. 7F
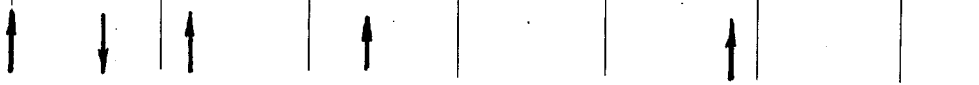
FIG. 7G

DIGITAL DETECTOR

This is a continuation of application Ser. No. 359,463 filed May 11, 1973.

This invention is concerned with a detector circuit for a dynamic phenomenon with a cyclically varying condition which may be sensed.

In one embodiment of the invention a speed measurement is made by sensing the movement of alternate teeth and spaces on a rotating wheel. In another embodiment, the condition of a three-phase electrical power circuit is detected by sensing an electrical condition in each phase.

It is known to measure the speed of a rotating part by detecting the movement of gear teeth past a fixed point, as with a magnetic sensor. See, for example, Gee U.S. Pat. No. 3,721,968 and the prior art cited therein.

Recent safety requirements for articulated trucks have emphasized the need for a low cost, high reliability speed detector as an element of an automatically controlled braking system to prevent skids. The preferred embodiment of the invention is described below with particular reference to such a speed detector. Many of the features of the invention may find other uses, however, and some will be pointed out herein.

One feature of the invention is that the detector for a dynamic phenomenon with a cyclically varying condition includes a plurality, $n$, of digital sensors which have alternate outputs of 1 or 0 and each sensor is displaced from the other sensors with respect to the cyclically varying condition by a factor which results in sensor outputs that have a plurality of sequential states. An output means is responsive to at least one selected state of the sensor outputs for indicating a characteristic of the dynamic phenomenon. Preferably, more than two sensors are used and there is at least one state of sensor output which does not occur during the existence of the dynamic phenomenon. The non-occurring state may be utilized to provide output information of the non-existence of the dynamic phenomenon.

Another feature of the invention is that the output of the detector is responsive to repetitive occurrence of one, or preferably two, of the plural sequential sensor output states to indicate the rate of the cyclically varying condition of the dynamic phenomenon.

A further feature is the provision of means responsive to a sensor output state which does not occur during the existence of the dynamic phenomenon, to inhibit operation of the output means.

Yet another feature is that the detector includes means for enabling the output means on the occurrence of a predetermined sensor output condition. In the preferred embodiment of the invention there must be a plurality of occurrences of selected sensor output states to enable the output circuit.

Further features and advantages of the invention will readily be apparent from the following specification and from the drawings, in which:

FIG. 2 is a fragmentary elevation of a toothed disc and three magnetic sensors used in the system of FIG. 1;

FIG. 3 is a fragmentary section taken along line 3—3 of FIG. 2;

FIG. 7 is a representation of the output produced by each tooth and slot combination and a series of six diagrams illustrating six different locations for three or more digital sensors with respect to any tooth and slot combination.

Figure 1:
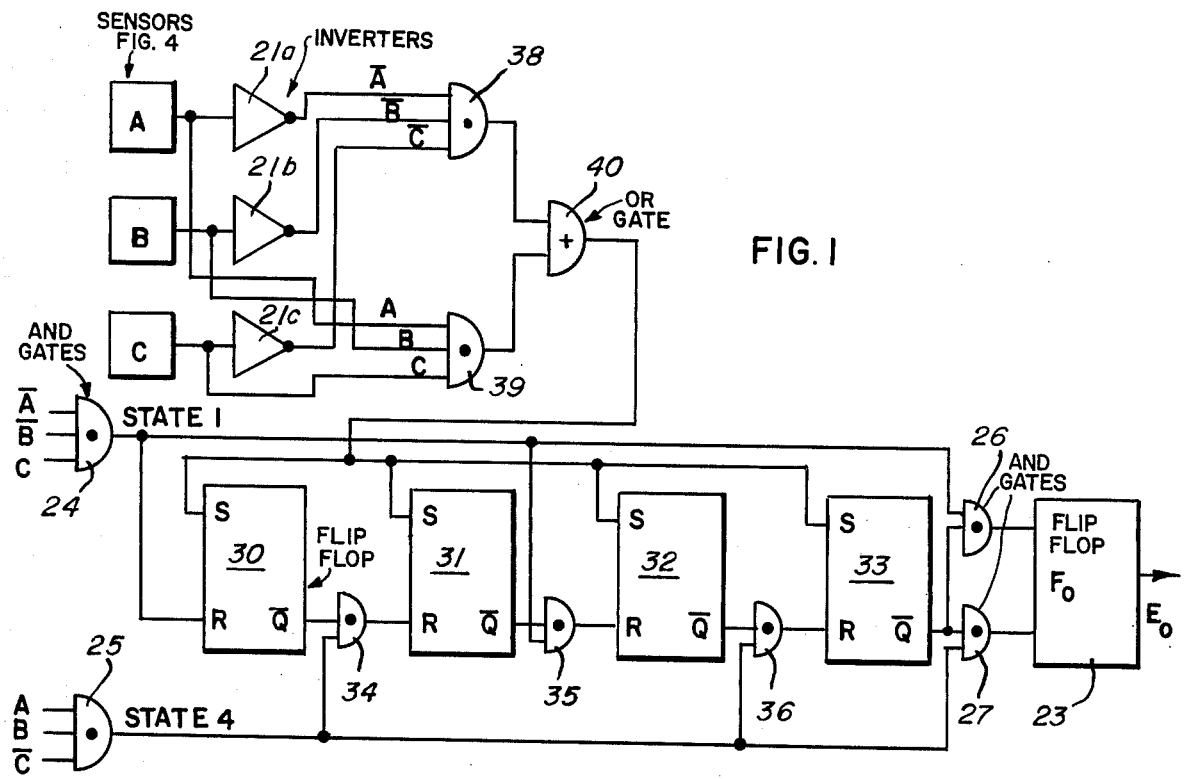
FIG. 1 is a block diagram of the preferred embodiment of the invention suitable for use in detecting the speed of rotation of a wheel.

FIGS. 1 through 5 illustrate a preferred embodiment of the invention where the dynamic phenomenon which is detected is the speed of rotation of an element, as the wheel of a truck. The rotating element includes, or has mounted thereon, a series of regular discontinuities which move past sensors, establishing the cyclically varying condition which is sensed. In the specific system illustrated, a toothed plate of magnetic material moves past magnetic sensors generating signals representing the cyclic condition.

The preferred embodiment of the invention is designed and intended for measuring the speed of a wheel of a vehicle, and particularly for detecting the speed of a wheel of a truck in an anti-skid control system. In such a system the speed of each driver wheel is measured, the speeds are compared electronically and the difference signal, if any, used to control the application of brakes to the wheel which is turning more rapidly. This system on articulated trucks will reduce the tendency of such trucks to skid and jackknife. The measurement of truck wheel speed with sufficient accuracy to establish a reliable difference signal presents several problems which, as will appear, are either eliminated or minimized by the digital system disclosed herein. One problem is interference from electrical noise, as from the truck ignition system and other electrical equipment. Another problem is that the wheel speed to be measured may range from two miles per hour to ninety miles per hour, an extremely wide range to be handled by analog techniques. Furthermore, where the wheel rotation is sensed by a pick up element adjacent the wheel itself, or at a plate which rotates with the wheel, if the spacing between the sensor and wheel or plate which is sensed is not constant as the wheel rotates, an analog signal is established as a result of the spacing variation as the wheel rotates. At high speeds the analog runout signal has a frequency which is comparable with that of the desired signal at low wheel speeds. Wheel vibration introduces a further undesired variable. This is particularly troublesome if the brakes have been applied to a wheel causing it to stop rotation but vibration which then occurs is interpreted as continuing wheel rotation. The anti-skid system acts to increase the force of brake application to the wheel that is already locked, inducing a skid situation rather than eliminating it.

The multiple sensor, digital system disclosed herein provides an accurate wheel speed output signal which is free from false information.

A plate 10, FIGS. 2 and 3, is secured to the wheel whose speed is to be measured and has an array of ribs or teeth 11 and slots 12 formed adjacent its periphery. It has been typical in the past to measure speeds by sensing the teeth on the periphery of a spur gear, see Gee U.S. Pat. No. 3,721,968, and it is common to refer to teeth in discussing such speed sensing. The radial ribs 11 are called teeth herein, in accordance with this practice. The teeth and slots extend radially and have equal widths. Three magnetic pickups 13a, 13b and 13c are mounted in spaced relation to the peripheral surface of plate 10 adjacent the teeth and slots 11, 12. As the teeth and slots move past the magnetic pickups, signals are induced in the coils of the pickups which provide the input to the detector. The three magnetic pickups 13 use three pole pieces 15a, 15b and 15c, each of which has a diameter comparable to the width of the teeth 11 and slots 12. As seen in FIG. 3, the end of each pole piece 15 has a nominal spacing from the plate surface of the order of 0.040 inch. However, the spacing may vary plus or minus 0.020 inch as a result of eccentricity in the plate mounting. A pair of permanent magnets 16' and 16" establish a pair of magnetic fields through the cores 15 and plate 10. The flux of the field through each core 15 varies as the adjacent teeth 11 and slots 12 move past the end of the associated pole piece. Three coils 17a, 17b and 17c respectively surround pole pieces 15a, 15b and 15c, each mounted on an associated bobbin of generally rectangular cross-section, as seen in FIG. 2. As the magnetic flux through each pole piece 15 changes, a voltage is induced in the associated coil 17. In a specific installation for measuring truck wheel speed, a plate having 120 teeth and 120 slots is mounted on the truck wheel. The width of each tooth and each slot is 0.109 inch. Each pole piece 15, as shown in FIG. 2, has a radial extent of 0.250 inch and a transverse or circumferential extent of 0.093 inch. For a range of truck speeds from 2 miles per hour to 90 miles per hour, the output of the magnetic pickup has a frequency range from 34 Hz to 1500 Hz.

Figure 4:
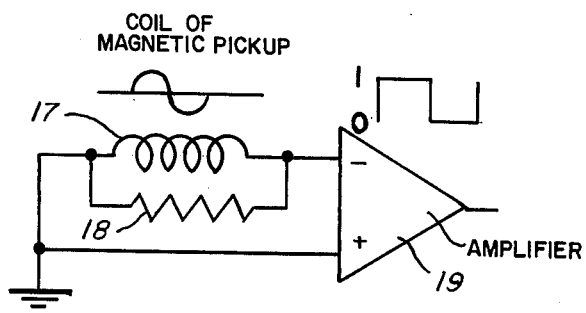
FIG. 4 is a schematic diagram of the pickup and digital amplifier.

FIG. 4 illustrates a suitable circuit for converting the coil output, which is generally sinusoidal at the frequencies of interest, to a square wave which can be handled readily with digital circuit techniques. The magnetic pickup coil 17 is shunted by a resistor 18 which forms a filter with the coil reducing the output at high frequencies. The signal from the coil is connected with one input of high gain amplifier 19, the other input of which is returned to ground. The amplifier output is essentially a square wave at the frequency of the sine wave signal developed in the coil. Each digital square wave signal has either a zero or one value.

Figure 5:
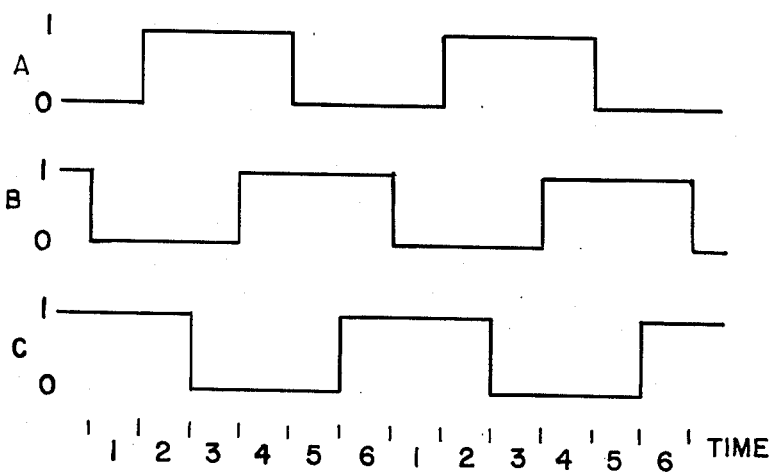
FIG. 5 is a series of three waveforms illustrating the outputs of the three digital sensors.

In FIG. 5 the digital outputs of the three magnetic pickups 13a, 13b and 13c are plotted as curves A, B, C, respectively. The magnetic pickups are physically spaced with respect to the teeth and slots 11, 12 of plate 10 so that the three signals are spaced 120 electrical degrees from each other. There are six sequential states for the three sensor outputs, identified in FIG. 5 and listed below.

| State | ABC |
|---|---|
| 1 | 001 |
| 2 | 101 |
| 3 | 100 |
| 4 | 110 |
| 5 | 010 |
| 6 | 011 |

The states in which the sensor outputs are 111 or 000 do not occur during normal rotation of plate 10, except as a result of overriding electrical noise or of vibration.

The circuit of FIG. 1 utilizes the plural sequential states of the sensor outputs to generate a speed related output signal during existence of the dynamic phenomenon and to inhibit the generation of an output signal upon the occurrence of one of the states which is not generated by wheel rotation. In the following discussion the one level of the digital sensor signal is represented by the appropriate capital letter, as A, while the zero level is represented by the negated signal, as $\overline{A}$. In FIG. 1 the three digital sensors are represented by the capital letters, A, B, C. The output of each sensor is connected with an inverter, 21a, 21b, 21c, respectively. Thus there are available six digital signals A, B, C, and $\overline{A}, \overline{B}, \overline{C}$. AND gates are represented by a semicircle with a dot while OR gates are represented by a semicircle with a plus sign.

Two of the sequential states of the sensor outputs which occur alternately during existence of the dynamic phenomenon are utilized to drive a bistable flip-flop output circuit 23. AND gate 24 has inputs $\overline{A}B\overline{C}$ and an output representing state 1 of the sensor signals. AND gate 25 has inputs $AB\overline{C}$ and output representing state 4 of the sensor outputs. The state 1 and state 4 signals are connected with AND gates 26 and 27, respectively. Assuming that the other inputs to AND gates 26, 27 are present, as will be discussed below, the outputs of AND gate 26 corresponds with state 1 and that of AND gate 27 with state 4. The AND gate outputs are connected with the inputs of bistable flip-flop 23. The output signal $E_0$ is a square wave with a repetition rate which is a measure of the speed of rotation plate 10 past the magnetic sensors 13a, 13b, 13c.

Bistable flip-flops 30, 31, 32 and 33 are serially connected through AND gates 34, 35 and 36 to provide the enabling inputs for AND gates 26, 27. In the event a sensor output condition occurs generating states 111 or 000, operation of the output circuit is inhibited. These two states represent noise, vibration or other interference and an output circuit signal derived from them is not reliable. AND gate 38 has inputs $\overline{A}\overline{B}\overline{C}$ while AND gate 39 has inputs ABC, representing the two noise conditions. The outputs of AND gates 38 and 39 are connected with the inputs of OR gate 40 which has an output N representing one or the other of the two noise states. Noise signal N is connected with the SET input S of each of the flip-flops 30, 31, 32 and 33, and upon occurrence of a noise signal shifts each of the flip-flops to the SET condition removing the $\overline{Q}$ output. This removes the enabling input from AND gates 26, 27 and prevents actuation of the output flip-flop 23 to generate an output signal even though the state 1 and state 4 signals are resumed.

The serially connected flip-flops 30–33 and AND gates 34–36 require two noise free cycles of the cyclically varying condition of the dynamic phenomenon in order to enable the output circuit. Upon the first occurrence of the state 1 condition following a noise signal N, flip-flop 30 is RESET. The $\overline{Q}$ output of flip-flop 30 is applied to one of the inputs of AND gate 34. Upon the next following occurrence of the state 4 condition, a signal is generated in the output of AND gate 34 applying an input to the RESET terminal of flip-flop 31. This provides a $\overline{Q}$ output to AND gate 35. On the next following occurrence of state 1 condition, AND gate 35 is actuated resetting flip-flop 32. The $\overline{Q}$ output of flip-flop 32 is applied to AND gate 36. On the following occurrence of a state 4 condition, flip-flop 33 is RESET and the $\overline{Q}$ output enables both AND gates 26 and 27. Subsequent state 1 and 4 conditions actuate the output flip-flop circuit 23. The occurrence of a noise signal at any time SETS all of the flip-flops 30–33 requiring two cycles of noise free operation to RESET each of them and enable the output circuit. Additional flip-flops and AND gates may be utilized to increase the noise immunity of the detector.

Figure 6:
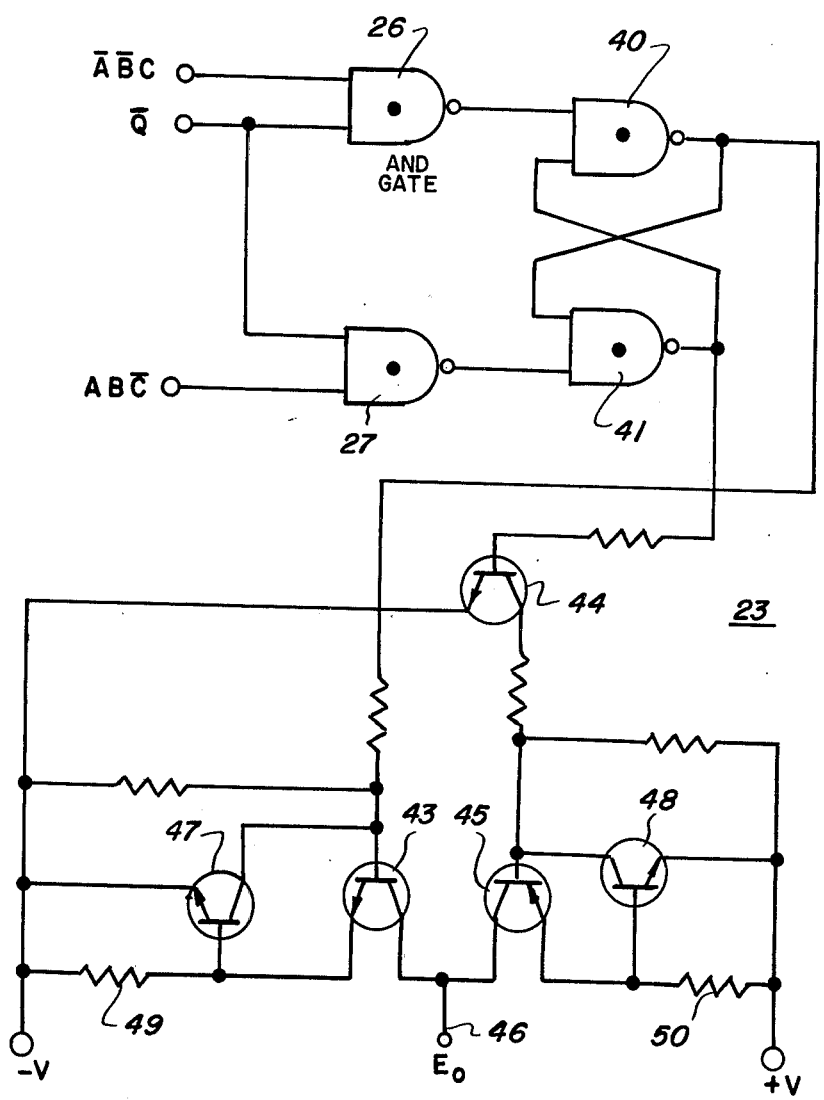
FIG. 6 is a schematic diagram of the output circuit of FIG. 1.

The output circuit is shown in more detail in FIG. 6. The inhibit/enable AND gates 26, 27 have their outputs connected with AND gates 40, 41 which are interconnected in a bistable circuit. The output of AND gate 40 is connected directly with power output transistor 43 while the output of AND gate 41 is connected through inverter transistor 44 with power output transistor 45. The emitter-collector circuits of output transistors 43, 45 are connected between the negative and positive voltage sources −V and +V and output terminal 46. One or the other of the transistors 43, 45 conducts establishing the output $E_0$ either at the −V or +V level. Current overload transistors 47, 48 are normally non-conductive. In the event of a current overload, as from short circuit in the utilization circuitry to which $E_0$ is connected, the current drawn through series resistors 49, 50 causes the appropriate overload transistor to conduct, clamping the base of the associated power transistor and limiting the current therethrough.

The digital detector is essentially a fail-safe device in that it cannot generate a false speed indicating signal $E_o$ at the output terminal 46. A failure of a circuit element will result in an output signal which is either continually +V or −V, or a floating voltage condition if both power transistors 43 and 45 are nonconducting. In either event the condition is unique and can be utilized to provide an alarm that the circuit is inoperative. If one of the magnetic pickups should fail, the alternate sequential states 1 and 4 do not occur, but one of the noise representing states 111 or 000 will inhibit the output circuit. In the unlikely event that two or all three of the pickups failed, the noise circuitry might not be actuated to SET all of the inhibit flip-flops. However, sequential states 1 and 4 do not occur and the output $E_o$ remains constant.

While three digital sensors have been described, each relatively spaced 120° apart with respect to an output waveform, almost any combination of three or more digital sensors having symmetrical or unsymmetrical spacing can be provided with appropriate logic for interpreting the states of the sensor outputs. Several feasible combinations are diagrammatically illustrated in FIG. 7 with respect to FIG. 7A, which illustrates one cycle of the square wave output of a single digital detector, produced by one tooth and one slot.

In FIG. 7B, the relative location of the three magnetic pickups shown in FIGS. 2 and 3 is illustrated. Each magnetic pickup is spaced relatively 120° apart, thereby producing the three output waveforms shown in FIG. 5. The arrow location for the second magnetic pickup, at 120°, indicates that this pickup should be located so as to produce an output which is offset 120° with respect to the output from the first magnetic pickup. Thus, the position of the arrow locations represents the desired electrical output with respect to the other electrical outputs, and does not represent a mechanical spacing, i.e., does not indicate that the magnetic pickup should be located 120° (one-third of the spacing of a single tooth-slot combination) away from the first magnetic pickup.

Although the plural magnetic pickups may be mechanically located at any circumferential position around the plate 10 which produces the desired electrical output, it is preferred that the pickups be spaced adjacent each other so as to minimize problems which otherwise would arise as the result of eccentricity in the plate mounting. The magnetic assembly of FIGS. 2 and 3, in which portions of the magnetic circuit are shared and thus represents the minimum spacing for the illustrated plate configuration, is a preferred embodiment.

The three magnetic pickups do not have to be mounted the electrical equivalent of 120° apart. For example, three magnetic pickups may be located as shown in FIG. 7C, in which the middle arrow which is directed oppositely to the other arrows represents an inverted output. This inversion may be produced, for example, by reversing the (−) and (+) inputs of amplifier 19 in FIG. 4. FIG. 7C is the equivalent of the output produced by the spacing and orientation shown in FIG. 7B. It is not necessary that the spacing of the magnetic pickups be symmetrical or balanced. In FIG. 7D, an unbalanced spacing is illustrated which will provide a suitable set of sensor outputs.

More than three magnetic pickups may be provided, having various spacing and orientations as desired. For example, FIG. 7E illustrates an unbalanced configuration which uses four magnetic pickup sensors. In FIGS. 7F and 7G, five magnetic pickup sensors are illustrated with symmetrical and unsymmetrical output waveforms, respectively. The digital outputs of the five magnetic pickups, as well as the states which do not occur during normal rotation of the plate, except as a result of overriding electrical noise or vibration, are listed below:

| FIVE SENSOR STATES | |
|---|---|
| Normal States | Missing States |
| 11100 | 00000 |
| 11000 | 00001 |
| 11001 | 00100 |
| 10001 | 00101 |
| 10011 | 01000 |
| 00011 | 01001 |
| 00111 | 01010 |
| 00110 | 01011 |
| 01110 | 01101 |
| 01100 | 01111 |
| 11100 | 10000 |
| | 10010 |
| | 10100 |
| | 10101 |
| | 10110 |
| | 10111 |
| | 11010 |
| | 11011 |
| | 11101 |
| | 11110 |
| | 11111 |

A four-pickup sensor configuration may be made by deleting any single sensor of the five sensors, in which event one column of the digits listed above would be deleted.

Figure 8:
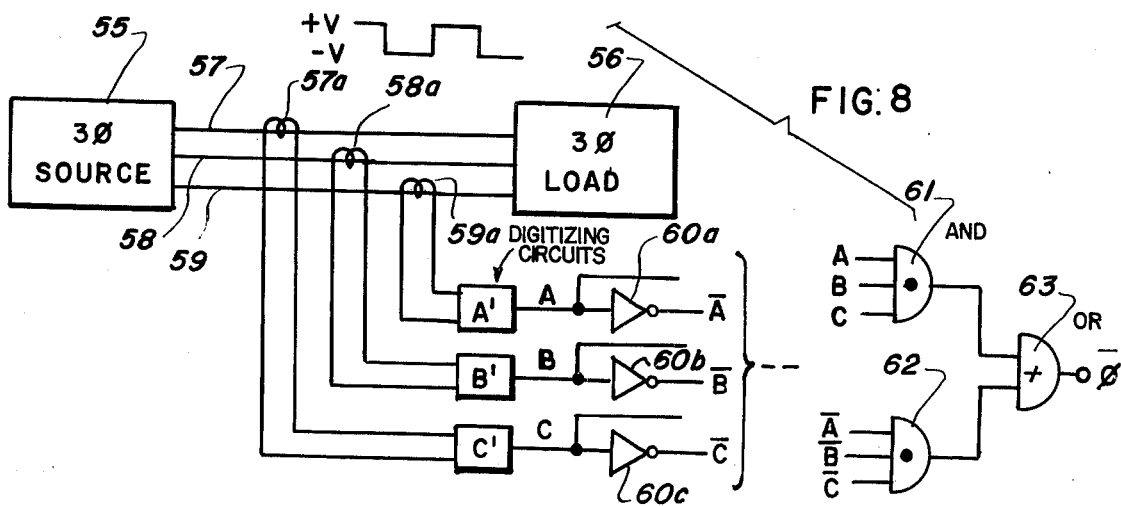
FIG. 8 is a diagram illustrating a modified form of the invention utilized in detecting a phase outage of a three phase electrical system.

The speed detector described in detail herein is one example of a detector for a dynamic phenomenon which may utilize the invention. FIG. 8 illustrates a detector for identifying a phase outage in a power distribution system. A three phase source 55 is connected with a three phase load 56 through a three wire distribution system 57, 58, 59. The current flowing in each wire of the distribution system is measured by current transformers 57a, 58a and 59a, connected respectively with the three lines as indicated. The outputs of the current transformers, which are nominally sine wave signals, are connected with suitable digital circuits A', B', C' to generate digital signals A, B, C. Inverters 60a, 60b, 60c provide $\bar{A}$, $\bar{B}$, $\bar{C}$ outputs. The A, B, C and $\bar{A}$, $\bar{B}$, $\bar{C}$ signals are connected as inputs to AND gates 61, 62, respectively, and the outputs of the two AND gates are connected with OR gate 63. So long as power distribution system operates correctly, the states A, B, C and $\bar{A}$, $\bar{B}$, $\bar{C}$ do not occur. In the event of a phase outage, one of these states will occur providing a signal $\bar{\phi}$ at the output of OR gate 63 to alert an operator, shut down the power distribution system or initiate suitable corrective action.

We claim:
1. In a speed detector for a rotary member having:
an element with an annular array of alternate slots and teeth of magnetic material,
an odd plurality of magnetic sensor means operably associated with said array of slots and teeth and responsive to relative motion between the array and sensor means,
circuit means to develop alternate digital 1 and 0 outputs from each sensor means, each sensor means being displaced from the other sensor means with respect to the slots and teeth whereby during relative motion the instantaneous outputs of the circuit means have a plurality of sequential states and there is at least one state of the circuit means outputs which does not occur during relative motion but does occur in the absence of such motion,
an AND gate having inputs connected with said circuit means and responsive to one of said plurality of sequential output states to generate a repetitive motion-indicating signal, and
an output circuit actuated by the motion-indicating signal from said AND gate to provide a measure of speed,
an improved inhibiting means for said output circuit, comprising:
an AND gate having inputs connected with the outputs of said circuit means and responsive to said one state of circuit means outputs which does not occur during the motion of the array to generate a fault signal;
means responsive to said fault signal for inhibiting operation of said output circuit; and
means responsive to repetitive occurrence of one of said plurality of sequential states subsequent to the generation of a fault signal, to enable said output means.

2. The detector of claim 1 wherein said enable means is responsive to a plurality of alternate occurrences of two of the plural output states of said circuit means to enable said output means.

3. The detector of claim 2 in which said inhibit and enable means include a plurality of serially connected bistable flip-flops, each having first and second inputs and first and second stable output states, responsive respectively to actuation of said first and second inputs, said inhibit means including means responsive to occurrence of said one state of said circuit means outputs to apply an input signal to the first input of each of said flip-flops to switch all said flip-flops to the first output state thereof, said enable means including means for connecting signals responsive to alternate occurrences of said two of the plural output states of the circuit means to the second inputs of successive flip-flops, to switch each individually to the second state thereof, and means connecting the last of said serially connected flip-flops to said output means to inhibit operation thereof when said last flip-flop is in its first state and to enable operation thereof when said last flip-flop is in its second state.

* * * * *